United States Patent
Hollstein et al.

[15] 3,681,387
[45] Aug. 1, 1972

[54] PREPARATION OF 2-PYRROLIDINONE

[72] Inventors: Elmer J. Hollstein, Wilmington, Del.; Kenneth A. Scott, Swarthmore, Pa.

[73] Assignee: Sun Oil Company, Philadelphia, Pa.

[22] Filed: Oct. 16, 1970

[21] Appl. No.: 81,545

[52] U.S. Cl. .................................260/326.5 FN
[51] Int. Cl. ..................................C07d 27/08
[58] Field of Search..........................260/326.5 FN

[56] References Cited

UNITED STATES PATENTS 3,092,638    6/1963    Liao et al.............260/326.5 FN

*Primary Examiner*—Alex Mazel
*Assistant Examiner*—Joseph A. Narcavage
*Attorney*—George L. Church, Donald R. Johnson, Wilmer E. McCorquodale, Jr. and Paul Lipsitz

[57] ABSTRACT

An improved process for preparing 2-pyrrolidinone at relatively low pressures which comprises reduction of succinimide in an aqueous system at temperatures of about 225° to 275° C., at a pressure in the range of about 1,200 to 1,500 p.s.i.g. and in the presence of a supported palladium catalyst.

5 Claims, No Drawings

PREPARATION OF 2-PYRROLIDINONE

The preparation of 2-pyrrolidinone from succinimide is known, but it appears that there is a high degree of specificity with respect to the reaction conditions and catalyst used. For example, although it has been suggested that lactams may be produced by hydrogenation of corresponding imides using a nickel catalyst, Paden and Adkins reported in The Journal of the American Chemical Society, Volume 58 (1936), page 249, that hydrogenation of succinimide over a nickel catalyst did not give 2-pyrrolidinone. Likewise, it is known in accordance with the disclosure of U. S. Pat. No. 3,092,638 of Hsiang P. Liao and William B. Tuemmler, Issued June 4, 1963, that succinimide may be converted to 2-pyrrolidinone by reduction in the presence of ammonia using a catalyst such as cobalt, nickel, ruthenium, palladium and platinum which may be supported on carbon or silica gel. However, when the process is attempted the absence of ammonia and under conditions of relatively low pressure (e.g., about 1,200 to 1,500 p.s.i.g.) catalysts such as Raney cobalt, ruthenium on carbon, and platinum on carbon are not operable.

In accord with the present invention, however, an efficient process for preparing 2-pyrrolidinone from succinimide is provided which involves hydrogenation at temperatures of about 225° to 275° C. at relatively low pressures of from about 1,200 to about 1,500 p.s.i.g., the reaction being carried out in an aqueous system and with a catalyst of palladium on an inert support.

In carrying out the process, succinimide, water, and catalyst are charged to a reaction chamber which is then closed and further charged with hydrogen to a pressure of about 500 p.s.i.g. The temperature of the reaction mass is then raised to about 225° to 275° C. and hydrogen pressure is maintained at about 1,200 to about 1,500 p.s.i.g. while the reaction mass is continuously agitated. After a time of about 0.5 to 5 hours, preferably about 2 hours, the heat is removed and the reaction mass allowed to cool, after which it is filtered to remove catalyst and flash distilled to remove excess water and volatiles. A vacuum distillation then gives the product 2-pyrrolidinone in good yield.

While the amounts of reagents are not critical it is generally desirable to operate within certain ranges. The amount of succinimide used will be such that under the conditions of reaction a significant amount will be in aqueous solution and, in general, from about 25 to about 100 parts by weight of succinimide per 100 parts by weight of water will be used. The catalyst, as indicated, is palladium on an inert support and will generally be about 5 percent by weight palladium. However, catalyst containing anywhere from about 0.5 to about 10 percent by weight on the support is also useful. The amount of supported catalyst which is generally used in the process may vary over a wide range, but will generally be from about 5 to about 20 parts by weight per 100 parts of succinimide.

The support for the palladium catalyst may be any of the usual catalyst supports which are inert under the conditions of the reaction. Thus, for example, supports such as carbon, alumina, fuller's earth, "kieselguhr," pumice powder, and silica, are all useful. Preferred supports are carbon, alumina, and "Kieselguhr".

As indicated, the hydrogen used in the process will be at a pressure between about 1,200 to 1,500 p.s.i.g., with about 1,200 p.s.i.g. preferred. The time of reaction will be from about 1 to about 5 hours, generally, but is preferably about 2 hours. Too long a reaction time should be avoided as yields tend to decrease and for this reason reaction time should not exceed about 5 hours. Likewise temperature of reaction should not be below 225° C. or above about 275° C. as yields tend to decrease also under these conditions.

In order to further illustrate the invention the following examples are given.

EXAMPLE 1

A one liter stainless steel rocking autoclave is charged with 99 grams (1 mole) of succinimide, 250 mls. of water, 10 grams of 5 percent by weight palladium supported on carbon as catalyst, and the autoclave closed and pressured with hydrogen to about 500 p.s.i.g. The closed reaction chamber is then heated to about 225° C. and hydrogen pressure is maintained at 1,000 ± 200 p.s.i.g. After 2 hours, the reaction mass is cooled and the product filtered and flash distilled to remove excess water a volatiles. The remaining product is then vacuum distilled to yield 37 grams or 43.5 mole percent of 2-pyrrolidinone.

When the above example is repeated with other materials as catalyst essentially no yield of 2-pyrrolidinone is obtained. This is shown in the following table.

Reduction of Succinimide To 2-Pyrrolidinone 99 gms. Succinimide 250 ml. Water

| Catalyst | % Yield of 2-Pyrrolidinone |
|---|---|
| 5% Ruthenium on Carbon | 1 |
| 5% Platinum on Carbon | 0 |
| Raney Cobalt (30 gms.) | 0 |
| 58% Nickel on Kieselguhr (20 gms.) | 0 |

It is clear from the above examples that the preparation of 2-pyrrolidinone is highly specific and the process of the invention requires the palladium catalyst.

EXAMPLE 2

Following the details of Example 1, additional runs were made under various reaction conditions. The data are shown in the following table:

Reduction of Succinimide To 2-Pyrrolidinone 99 gms. Succinimide 250 ml. H$_2$O 5% Pd on Carbon Catalyst

| Time (Hrs.) | Temp (° C.) | Press. (p.s.i.g.) | Catalyst (gms) | Yield of Pyrrolidinone (Mole %) |
|---|---|---|---|---|
| 2 | 190 | 500 | 5 | 0 |
| 2 | 250 | 500 | 20 | 0 |

| 2 | 190 | 1500 | 20 | 19.4 |
| 2 | 250 | 1500 | 5  | 43.8 |
| 2 | 275 | 1200 | 10 | 60   |
| 2 | 300 | 1200 | 10 | 13   |

As can be seen from data in the above examples the reaction proceeds significantly only under the conditions of temperatures between about 225° to 275° C. and at about 1,200 to about 1,500 p.s.i.g.

EXAMPLE 3

Following the details of Example 1, 49.5 g. of succinimide and 5 g. of 5 percent by weight palladium supported on alumina as catalyst was charged to the autoclave and the reduction carried out at 1,200 p.s.i.g. for 2 hours at 275° C. Yield of 2-pyrrolidinone was 68.7 mole percent.

The invention claimed is:

1. A process for the preparation of 2-pyrrolidinone which comprises reducing succinimide in an aqueous system in the absence of added ammonia under hydrogen pressure of about 1,200 to about 1,500 psig, at a temperature of about 225° to 275° C. and in the presence of from about 5 to about 20 parts by weight per 100 parts of succinimide of a palladium catalyst comprised of from about 0.5 percent to about 10 percent by weight palladium on an inert support.

2. The process of claim 1 where the hydrogen pressure is about 1,200 p.s.i.g. and the temperature is about 275° C.

3. The process of claim 2 where the reaction time is between about 1 and about 5 hours.

4. The process of claim 3 where the catalyst is palladium supported on carbon.

5. The process of claim 3 where the catalyst is palladium supported on alumina.

* * * * *